United States Patent
Zhao et al.

(10) Patent No.: US 10,403,218 B2
(45) Date of Patent: Sep. 3, 2019

(54) MURA COMPENSATION CIRCUIT AND METHOD, DRIVING CIRCUIT AND DISPLAY DEVICE

(71) Applicants: BOE Technology Group Co., Ltd., Beijing (CN); Hefei Xinsheng Optoelectronics Technology Co., Ltd., Hefei (CN)

(72) Inventors: Jian Zhao, Beijing (CN); Mo Chen, Beijing (CN); Yudong Liu, Beijing (CN); Xiong Xiong, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 153 days.

(21) Appl. No.: 15/515,922

(22) PCT Filed: May 12, 2016

(86) PCT No.: PCT/CN2016/081867
§ 371 (c)(1),
(2) Date: Mar. 30, 2017

(87) PCT Pub. No.: WO2017/143669
PCT Pub. Date: Aug. 31, 2017

(65) Prior Publication Data
US 2018/0233096 A1  Aug. 16, 2018

(30) Foreign Application Priority Data
Feb. 26, 2016  (CN) .......................... 2016 1 0108632

(51) Int. Cl.
*G09G 3/36* (2006.01)
*G02F 1/133* (2006.01)

(52) U.S. Cl.
CPC ....... *G09G 3/3648* (2013.01); *G02F 1/13306* (2013.01); *G09G 3/3688* (2013.01);
(Continued)

(58) Field of Classification Search
CPC .. G09G 3/3648; G09G 3/3688; G09G 3/3696; G09G 2320/0693;
(Continued)

(56) References Cited

U.S. PATENT DOCUMENTS

| 9,536,498 B2 | 1/2017 | Wu et al. |
| 2010/0013751 A1* | 1/2010 | Kerofsky ............... G09G 3/006 345/89 |
| 2015/0332638 A1* | 11/2015 | Li ........................ G09G 3/3648 345/214 |

FOREIGN PATENT DOCUMENTS

| CN | 101772801 A | 7/2010 |
| CN | 101802903 A | 8/2010 |

(Continued)

OTHER PUBLICATIONS

Dec. 1, 2016—(WO) International Search Report and Written Opinion Appn PCT/CN2016/081867 with English Tran.
(Continued)

*Primary Examiner* — Andrew Sasinowski
(74) *Attorney, Agent, or Firm* — Banner & Witcoff, Ltd.

(57) ABSTRACT

A Mura compensation circuit and method, a driving circuit and a display device are provided. The Mura compensation circuit comprises: a vertical Mura compensation unit, for providing a corresponding gamma voltage to a vertical block Mura region and a vertical non-Mura region of a display panel respectively, to compensate for a vertical Mura phenomenon; and/or a horizontal Mura compensation unit, for providing a corresponding gate drive signal and/or a corresponding charging/discharging control signal to a horizontal block Mura region and a horizontal non-Mura region of a
(Continued)

display panel respectively, to compensate for a horizontal Mura phenomenon. The Mura compensation circuit can make the different regions of the display panel have the same display effect, and improve reduction of display quality caused by impedance difference at different positions of the display panel, thereby raising the quality of a picture, and can be promoted and applied widely.

20 Claims, 5 Drawing Sheets

(52) U.S. Cl.
CPC ... *G09G 3/3696* (2013.01); *G09G 2320/0233* (2013.01); *G09G 2320/0276* (2013.01); *G09G 2320/0693* (2013.01)

(58) Field of Classification Search
CPC .... G09G 2320/0276; G09G 2320/0233; G02F 1/13306
See application file for complete search history.

(56) References Cited

FOREIGN PATENT DOCUMENTS

| | | |
|---|---|---|
| CN | 103474016 A | 12/2013 |
| CN | 103500566 A | 1/2014 |
| CN | 105575350 A | 5/2016 |
| KR | 20150077171 A | 7/2015 |

OTHER PUBLICATIONS

Jan. 25, 2017—(CN) First Office Action Appn 201610108632.9 with English Tran.
Jun. 27, 2017—Second Office Action Appn issued 201610108632.9 with English Tran.

* cited by examiner

→ # MURA COMPENSATION CIRCUIT AND METHOD, DRIVING CIRCUIT AND DISPLAY DEVICE

The application is a U.S. National Phase Entry of International Application No. PCT/CN2016/081867 filed on May 12, 2016, designating the United States of America and claiming priority to Chinese Application No. 201610108632.9 filed on Feb. 26, 2016. The present application claims priority to and the benefit of the above-identified applications and the above-identified applications are incorporated by reference herein in their entirety.

TECHNICAL FIELD

The present disclosure relates to a Mura compensation circuit and method, driving circuit and display device.

BACKGROUND

Compared with a conventional cathode ray tube display, a liquid crystal display has advantages of thin & light body, low power consumption, no radiation, and long operation life, etc. Due to these advantages, the liquid crystal display, as a panel display device, is widely applicable to electronic products such as a mobile phone, a computer, a television set, and a digital camera, etc., and has dominated the market of panel display.

As panel display technique develops fast, in order to reduce production cost, a design of a large-size liquid crystal display panel would adopt a driving IC (Integrated Circuit) including more channels, or adopt a dual gate/triple gate drive design. Impedance difference between fan-out region wirings of such design becomes large, which is likely to result in negative phenomena such as block Mura (Mura refers to brightness non-uniformity of a display) in vertical/horizontal direction. In order to solve these negative phenomena caused by impedance difference, a designer usually utilizes a method of designing the fan-out region wirings as a snakelike wiring/double-layer wiring, or matches internal impedance of the driving IC with impedance of peripheral fan-out region wirings, so as to achieve the purpose of equivalent resistance by integrating impedances. Due to design limitation, the above method cannot achieve an ideal effect, cannot eliminate Mura negative phenomenon from occurring completely, and thus would reduce picture quality of the liquid crystal display panel.

SUMMARY

There are provided in the present disclosure a Mura compensation circuit and method, a driving circuit and a display device.

According to one aspect of the present disclosure, there is provided a Mura compensation circuit, comprising:

a vertical Mura compensation unit, configured to compensate for a vertical Mura phenomenon by providing a corresponding gamma voltage to a vertical block Mura region and a vertical non-Mura region of a display panel respectively; and/or a horizontal Mura compensation unit, configured to compensate for a horizontal Mura phenomenon by providing a corresponding gate drive signal and/or a corresponding charging/discharging control signal to a horizontal block Mura region and a horizontal non-Mura region of a display panel respectively.

Alternatively, the horizontal Mura compensation unit is used to provide a first gate drive signal to the horizontal block Mura region and provide a second gate drive signal to the horizontal non-Mura region;

a high level value of the first gate drive signal and a high level value of the second gate drive signal are different; and/or a low level value of the first gate drive signal and a low level value of the second drive signal are different.

Alternatively, the horizontal Mura compensation unit is configured to provide charging/discharging control signals having different duty ratios to the horizontal block Mura region and the horizontal non-Mura region.

The charging/discharging control signals include a data source row latch signal and/or an output enable signal.

Alternatively, the vertical Mura compensation unit comprises a plurality of gamma voltage registers, which are disposed in a source driver.

Alternatively, the horizontal Mura compensation unit comprises a plurality of shift register units, each of which outputs a corresponding gate drive signal.

There is further provided in the present disclosure a Mura compensation method, comprising:

compensating for a vertical Mura phenomenon by providing, by a vertical Mura compensation unit, a corresponding gamma voltage to a vertical block Mura region and a vertical non-Mura region of a display panel respectively; and/or compensating for a horizontal Mura phenomenon by providing, by a horizontal Mura compensation unit, a corresponding gate drive signal and/or a corresponding charging/discharging control signal to a horizontal block Mura region and a horizontal non-Mura region of a display panel respectively.

Alternatively, the providing, by a horizontal Mura compensation unit, a corresponding respectively comprises: providing, by the horizontal Mura compensation unit, a first gate drive signal to the horizontal block Mura region and a second gate drive signal to the horizontal non-Mura region;

a high level value of the first gate drive signal and a high level value of the second gate drive signal are different; and/or a low level value of the first gate drive signal and a low level value of the second drive signal are different.

Alternatively, the providing, by a horizontal Mura compensation unit, a corresponding gate drive signal and/or a corresponding charging/discharging control signal to a horizontal block Mura region and a horizontal non-Mura region of a display panel respectively comprises: providing, by the horizontal Mura compensation unit, charging/discharging control signals having different duty ratios to the horizontal block Mura region and the horizontal non-Mura region; the charging/discharging control signals including a data source row latch signal and/or an output enable signal.

Alternatively, the Mura compensation method provided in the present disclosure further comprises: sampling gamma voltage of a Mura region on the display panel to obtain a corresponding sample gamma curve, comparing the sample gamma curve with a standard gamma curve, and adjusting it into a gamma voltage provided by the Mura region according to a comparison result until an adjusted gamma curve of the Mura region coincides with the standard gamma curve.

There is further provided in the present disclosure a driving circuit of a display panel, comprising the Mura compensation circuit described above.

Alternatively, the driving circuit of the display panel provided in the present disclosure further comprises N source drivers disposed along horizontal direction at upper side or lower side of the display panel, where N is a positive integer;

a vertical Mura compensation unit in the Mura compensation circuit comprises M gamma voltage registers, where M is an integer greater than 1; and each of the source drivers is disposed with a plurality of gamma voltage registers disposed along horizontal direction.

Alternatively, the driving circuit of the display panel provided in the present disclosure further comprises a gate driver;

a horizontal Mura compensation unit in the Mura compensation circuit comprises a plurality of shift register units disposed sequentially from top to down along left side or right side of the display panel, each of which outputs a corresponding gate drive signal; and the plurality of shift register units are disposed in the gate driver.

There is further provided in the present disclosure a display device, comprising a display panel and the driving circuit of the display panel described above.

The Mura compensation circuit and method, the driving circuit and the display device provided in the present disclosure adopt the vertical Mura compensation unit to provide gamma voltages having different values to the vertical block Mura region and the vertical non-Mura region of the display panel, so as to compensate for the vertical Mura phenomenon, and adopt the horizontal Mura compensation unit to provide different gate drive signals and/or different charging/discharging control signals to the horizontal block Mura region and the horizontal non-Mura region of the display panel, so as to compensate for the horizontal Mura phenomenon, such that different regions of the display panel can have the same display effect and improve the reduction of display quality caused by impedance difference at different positions of the display panel, thereby raising quality of a picture, and solving the problems of failing to achieve an ideal effect, being unable to eliminate completely the Mura negative phenomenon from occurring and reducing the quality of picture of the liquid crystal display panel due to a design limitation and so on. It can be promoted and applied widely.

DETAILED DESCRIPTION

Technical solutions in embodiments of the present disclosure will be described below clearly and completely by combining with accompanying drawings in the embodiments of the present disclosure. Obviously, the embodiments described below are just a part of embodiments of the present disclosure, rather than all of the embodiments.

Figure 1:
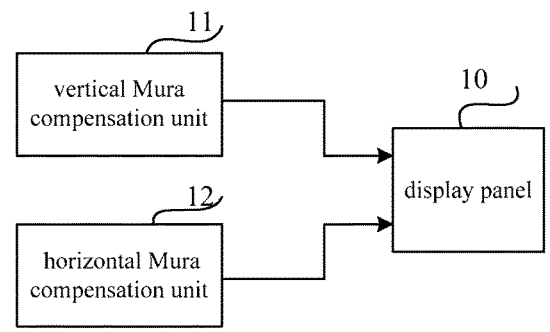
FIG. 1 is a block diagram of structure of a Mura compensation circuit provided in an embodiment of the present disclosure.

FIG. 1 shows a block diagram of a structure of a Mura compensation circuit provided in an embodiment of the present disclosure. As shown in FIG. 1, the Mura compensation circuit provided in the embodiment of the present disclosure comprises:

a vertical Mura compensation unit 11, for providing a corresponding gamma voltage to a vertical block Mura region and a vertical non-Mura region of a display panel 10 respectively, to compensate for a vertical Mura phenomenon; and/or a horizontal Mura compensation unit 12, for providing a corresponding gate drive signal and/or a corresponding charging/discharging control signal to a horizontal block Mura region and a horizontal non-Mura region of the display panel 10 respectively, to compensate for horizontal Mura phenomenon.

The Mura compensation circuit provided in the embodiment of the present disclosure adopts the vertical Mura compensation unit 11 to provide gamma voltages having different values to the vertical block Mura region and the vertical non-Mura region of the display panel 10, so as to compensate for the vertical Mura phenomenon, and adopts the horizontal Mura compensation unit 12 to provide different gate drive signals and/or different charging/discharging control signals to the horizontal block Mura region and the horizontal non-Mura region of the display panel 10, so as to compensate for the horizontal Mura phenomenon, such that different regions of the display panel have a same display effect, which is capable of improving reduction of display quality caused by impedance difference of different positions in the display panel, thereby raising quality of a picture and the Mura compensation circuit can be promoted and applied widely.

For example, the vertical Mura compensation unit can comprise a plurality of gamma voltage registers, so as to facilitate providing corresponding gamma voltages to the vertical block Mura region and the vertical non-Mura region of the display panel;

The plurality of gamma voltage registers are disposed in a source driver.

In actual operation, the plurality of gamma voltage registers can be arrange at upper side or lower side of the display panel from left to right sequentially.

According to a specific implementation, the horizontal Mura compensation unit is used to provide a first gate drive signal to the horizontal block Mura region and provide a second gate drive signal to the horizontal non-Mura region;

a high level value Vgh1 of the first gate drive signal and a high level value Vgh2 of the second gate drive signal are different; and/or a low level value Vgl1 of the first gate drive signal and a low level value Vgl2 of the second gate drive signal are different.

When the horizontal Mura compensation unit provides different gate drive signals to compensate for Mura, the effect of changing charging/discharging is achieved by adjusting the high level value Vgh and/or the low level value Vgl of the gate drive signal, such that different regions on the display panel have a same display effect, so as to achieve the effect of improving negative phenomenon and raising quality of the picture of the display panel.

Herein, the vertical block Mura region refers to a region where a block on the display panel 10 in vertical direction has Mura phenomenon, while the vertical non-Mura region refers to a region where a block on the display panel 10 in vertical direction has no Mura phenomenon; the horizontal block Mura region refers to a region where a block on the display panel 10 in horizontal direction has Mura phenomenon, while the horizontal non-Mura region refers to a region where a block on the display panel 10 in horizontal direction has no Mura phenomenon.

For example, the horizontal Mura compensation unit can comprise a plurality of shift register units, each of which outputs a corresponding gate drive signal, so as to be capable of facilitating to provide a gate drive signal having a corresponding high level value and/or low level value to the horizontal block Mura region and the horizontal non-Mura region of the display panel.

In actual operation, the plurality of shift register units can be disposed in the gate driver. The plurality of shift register units are disposed at left side or right side of the display panel from top to down sequentially.

According to another specific implementation, the horizontal Mura compensation unit is used to provide charging/discharging control signals having different duty ratios to the horizontal block Mura region and the horizontal non-Mura region.

The charging/discharging control signal can comprise a data source row latch (TP) signal and/or an output enable (OE) signal.

In actual operation, the horizontal Mura compensation unit can also influence the charging/discharging effect of different regions on the display panel by changing the duty ration of the charging/discharging control signal, so as to achieve the purpose of compensation.

The charging/discharging control signal can not only be a TP (data source row latch) signal provided by a timing controller to a source driver, but also be an OE signal provided by the timing controller to the gate driver.

The Mura compensation method provided in the embodiment of the present disclosure executes following operations:

S1: the vertical Mura compensation unit provides corresponding gamma voltages to the vertical block Mura region and the vertical non-Mura region of the display panel respectively to compensate for vertical Mura phenomenon; and/or, S2: the horizontal Mura compensation unit provides corresponding gate drive signals and/or corresponding charging/discharging control signals to the horizontal block Mura region and the horizontal non-Mura region of the display panel respectively to compensate for horizontal Mura phenomenon.

The Mura compensation method as described in the embodiment of the present disclosure provides gamma voltages having different values to the vertical block Mura region and the vertical non-Mura region of the display panel by adopting the vertical Mura compensation unit, so as to compensate for the vertical Mura phenomenon, and provides different gate drive signals and/or different charging/discharging control signals to the horizontal block Mura region and the horizontal non-Mura region of the display panel by adopting the horizontal Mura compensation unit, so as to compensate for the horizontal Mura phenomenon, such that different regions of the display panel have the same display effect, which is capable of improving reduction of display quality caused by impedance difference at different positions within the display panel, thereby improving quality of the picture. Therefore, the Mura compensation method can be promoted and used widely.

For example, a step of providing, by the horizontal Mura compensation unit, corresponding gate drive signals to the horizontal block Mura region and the horizontal non-Mura region of the display panel respectively comprises: providing, by the horizontal Mura compensation unit, a first gate drive signal to the horizontal block Mura region and a second gate drive signal to the horizontal non-Mura region;

the high level value of the first gate drive signal and the high level value of the second gate drive signal are different; and/or the low level value of the first gate drive signal and the low level value of the second gate drive signal are different.

When the horizontal Mura compensation unit provides a different gate drive signal to compensate for Mura, the high level value Vgh and/or low level value Vgl of the gate drive signal is adjusted, so as to achieve the effect of changing charging/discharging, such that different regions on the display panel have a same display effect, thereby achieving the effect of improving negative phenomenon and raising quality of picture of the display panel.

For example, a step of providing, by the horizontal Mura compensation unit, corresponding charging/charging control signals to the horizontal block Mura region and the horizontal non-Mura region of the display panel respectively comprises: providing, by the horizontal Mura compensation unit, charging/discharging control signals having different duty ratios to the horizontal block Mura region and the horizontal non-Mura region; the charging/discharging control signals comprise a TP signal and/or a OE signal.

In actual operation, the horizontal Mura compensation unit can also influence the charging/discharging effect of different regions on the display panel by changing the duty ratios of the charging/discharging control signals, so as to realize the purpose of compensation.

Alternatively, the Mura compensation method provided in the embodiment of the present disclosure further comprises: sampling the gamma voltage of the Mura region on the display panel to obtain a corresponding sample gamma curve (the gamma curve is a relation curve of transmittance and gray scale); comparing the sample gamma curve with a standard gamma curve, and adjusting a gamma voltage provided to the Mura region according to a comparison result until the adjusted gamma curve of the Mura region coincides with the standard gamma curve.

The Mura method provided in the embodiment of the present disclosure adds steps of gamma curve sampling and comparing, such that gamma curves of respective regions on the display panel coincide with the standard gamma curve, thereby optimizing the display effect.

The driving circuit of the display panel provided in the embodiment of the present disclosure comprises the Mura compensation circuit.

For example, the driving circuit of the display panel of the present disclosure further comprises N source drivers disposed along horizontal direction at upper side or lower side of the display panel, where N is a positive integer.

A vertical Mura compensation unit in the Mura compensation circuit comprises M gamma voltage registers, where M is an integer greater than 1;

Each of the source drivers is provided with a plurality of gamma voltage registers disposed along the horizontal direction.

For example, the driving circuit of the display panel as described in the embodiment of the present disclosure further comprises a gate driver;

A horizontal Mura compensation unit in the Mura compensation circuit comprises a plurality of shift register units disposed sequentially from top to down along left side or right side of the display panel, each of which outputs a corresponding gate drive signal;

The plurality of shift register units are disposed in the gate driver.

The Mura compensation circuit provided in the present disclosure is described by three specific embodiments below.

Figure 2:
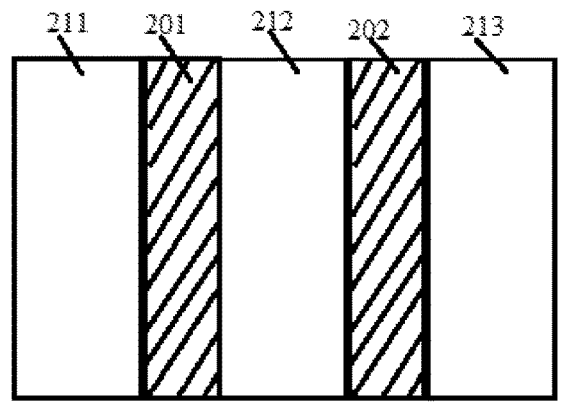
FIG. 2 is a schematic diagram of vertical block Mura negative phenomenon occurring on a liquid crystal display.

FIG. 2 shows a schematic diagram of vertical block Mura negative phenomenon occurring on a liquid crystal display panel. As shown in FIG. 2, vertical block Mura negative phenomenon has occurred on the liquid crystal display panel. In FIG. 2, 201 represents a first vertical block Mura region, 202 represents a second vertical block Mura region; 211 represents a first vertical non-Mura region, 212 represent a second vertical non-Mura region, and 213 represents a third vertical non-Mura region.

A first specific embodiment of the Mura compensation circuit of the present disclosure inputs different gamma voltages in the vertical block Mura region and the vertical non-Mura region, such that different regions of the liquid crystal display panel have the same display effect, so as to realize the purpose of improving negative phenomenon and raising the quality of picture.

Figure 3:
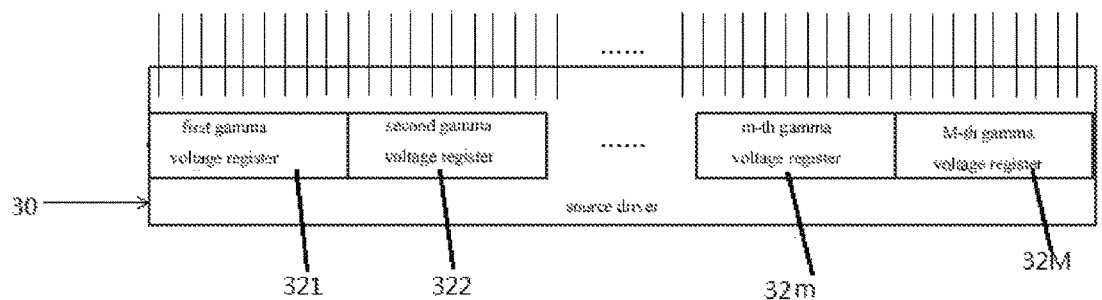
FIG. 3 is schematic diagram of a structure that a first specific embodiment of a Mura compensation circuit provided in an embodiment of the present disclosure comprises a vertical Mura compensation unit.

FIG. 3 shows a schematic diagram of a structure that a first specific embodiment of a Mura compensation circuit provided in an embodiment of the present disclosure comprises a vertical Mura compensation unit. As shown in FIG. 3, in the first specific embodiment of the Mura compensation circuit, the vertical Mura compensation unit comprises M gamma voltage registers, the display device comprises a source driver 30, and M gamma voltage registers are disposed in the source driver 30.

The M gamma voltage registers are disposed in the source driver 30 from left to right sequentially.

In FIG. 3, reference numeral 321 represents a first gamma voltage register, reference numeral 322 represents a second gamma voltage register, 32m represents a m-th gamma voltage register, and 32M represents a M-th gamma voltage register, where M is a positive integer greater than 4, m is a positive integer and m is equal to M−1. For example, when M is equal to 5, m is equal to 4.

Output 1 represents a first output terminal (i.e., an output terminal at the leftmost end) of the source driver 30, Output N represents a N-th output terminal (i.e., an output terminal at the rightmost end) of the source driver 30, where N is the number of output terminals of the source driver 30, and N is a positive integer.

In the first specific embodiment of the Mura compensation circuit as described in the present disclosure, for the source driver 30 having N output terminals, the gamma voltage output by the source driver 30 is set as M groups, and in terms of hardware, it only needs to transform and divide a gamma voltage register of an original single block into M gamma voltage registers.

The first specific embodiment of the Mura compensation circuit as described in the present disclosure arranges output terminals which are adjustable/continuously adjustable for multiple regions by utilizing the selectivity of the gamma voltage output from inside of the source driver.

By taking the vertical block Mura in FIG. 2 as an example, a gamma curve of the vertical block Mura region (for example, the first vertical block Mura region 201, the second vertical block Mura region 202) actually measured and obtained would certainly deviate from the standard gamma curve whose gamma value is 2.2. The gamma voltage within the gamma voltage register in the source driver 30 corresponding to the vertical block Mura region is changed, and thus the gamma curve within the vertical block Mura region is adjusted, such that the actually measured gamma curve of the vertical block Mura region coincides with the standard gamma curve whose gamma value is 2.2. That is, the display effect of the vertical block Mura region is controlled to be the same as the display effect of the vertical non-Mura region, so as to realize the purpose of improving negative phenomenon and raising quality of the picture.

Figure 4:
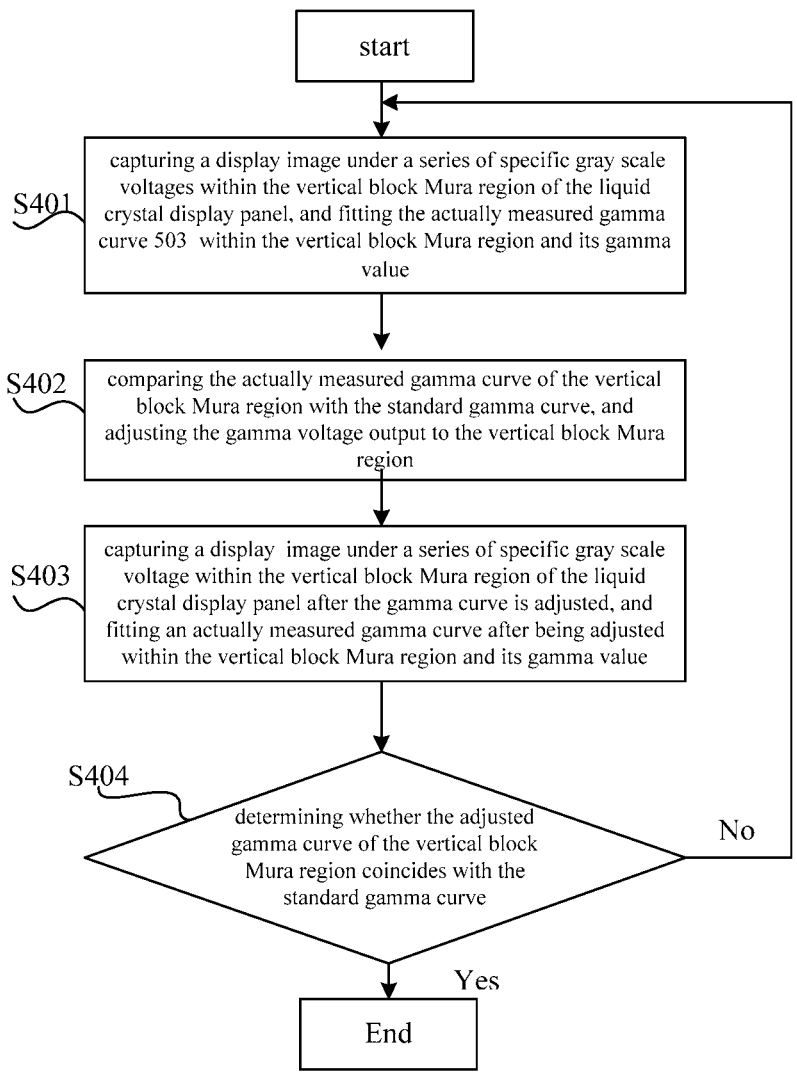
FIG. 4 is a flow diagram of a gamma curve comparing and adjusting method comprised in a Mura compensation method provided in an embodiment of the present disclosure.

The flow diagram of the gamma curve calibration is as shown in FIG. 4.

Figure 5:
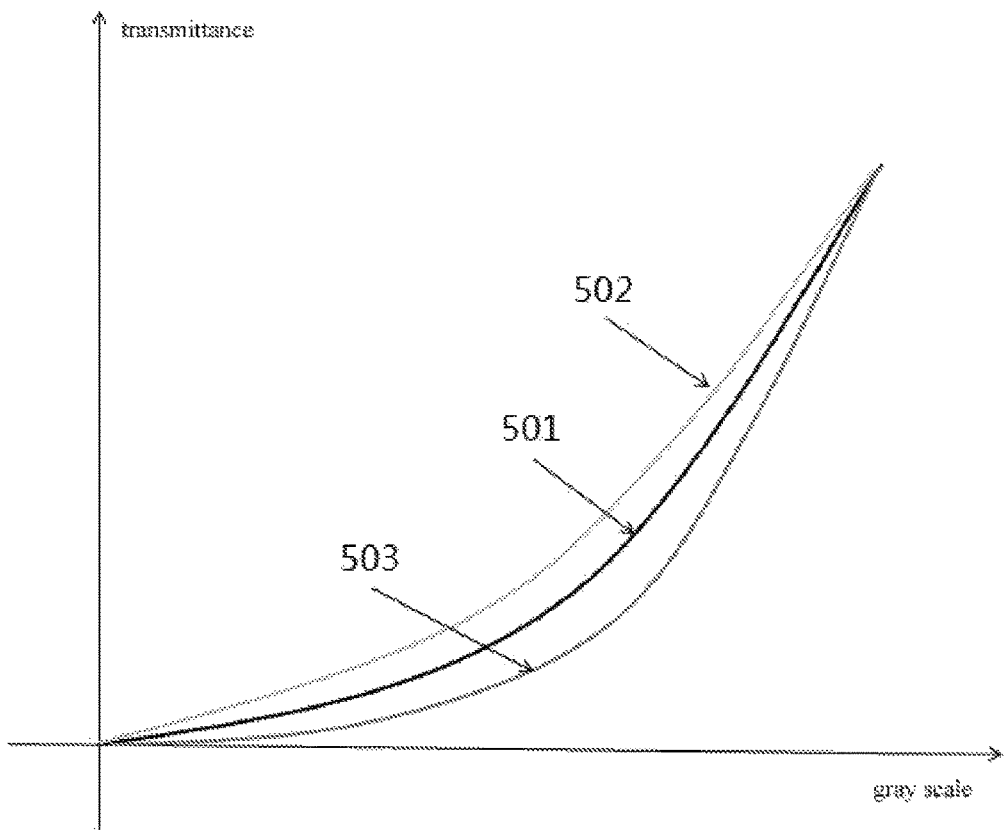
FIG. 5 is a schematic diagram of a gamma curve of a liquid crystal display panel.

As shown in FIG. 4, in step S401, it needs to capture a display image under a series of specific gray scale voltages within the vertical block Mura region of the liquid crystal display panel, and fit the actually measured gamma curve 503 (this actually measured gamma curve 503 is shown in FIG. 5) within the vertical block Mura region and its gamma value.

In step 402, the present embodiment is analyzed by taking the actually measured gamma curve within the vertical block Mura region being the gamma curve whose gamma value is smaller than 2.2 as an example, and the actually measured gamma curve is the gamma curve 503 in FIG. 5. This actually measured gamma curve 503 is compared with the standard gamma curve 501. It can be seen that the actually measured gamma curve 503 within the vertical block Mura region deviates from the standard gamma curve 501 whose gamma value is 2.2, thereby causing non-uniformity of display. It needs to output the gamma voltage of the vertical block Mura region and the gamma voltage of the vertical non-Mura curve respectively so as to control them separately. The corresponding gamma voltage register in the source driver corresponding to the vertical block Mura region is adjusted correspondingly, so that the gamma voltage output by the gamma voltage register refers to the gamma curve 502 in FIG. 5, i.e., referring to a gamma voltage value corresponding to the gamma curve 502 whose gamma value is greater than 2.2, to control the vertical block Mura region. The purpose of such control is to make the gamma curve within the vertical block Mura region deviate from the previous direction of the gamma curve 503 whose gamma value is smaller than 2.2 to the direction of the standard gamma curve 501 whose gamma value is equal to 2.2.

In step S403, a display image under a series of specific gray scale voltage within the adjusted vertical block Mura region of the liquid crystal display panel is captured, and an actually measured gamma curve after being adjusted within the vertical block Mura region and its gamma value are fit.

In step S404, it is determined whether the adjusted gamma curve of the vertical block Mura region coincides with the standard gamma curve.

If the adjusted gamma curve of the vertical block Mura region coincides with the standard gamma curve, then the adjusting ends up. The display effect that the vertical block Mura region on the liquid crystal display panel has been adjusted is the same as the display effect of the vertical non-Mura region on the liquid crystal display panel. The vertical Mura phenomenon cannot be observed, and the vertical Mura negative phenomenon is improved.

If the adjusted gamma curve of the vertical block Mura region does not coincide with the standard gamma curve, it needs to adjust the gamma voltage of the vertical block Mura region again. The method of adjusting is as follows: 1) if the gamma value of the adjusted gamma curve within the vertical block Mura region is smaller than 2.2, it needs to adjust by referring to the gamma voltage corresponding to the gamma curve whose gamma value is greater than 2.2; 2) if the gamma value of the adjusted gamma curve of the vertical block Mura region is greater than 2.2, it needs to adjust by referring to the gamma voltage corresponding to the gamma curve whose gamma value is smaller than 2.2. Selection of the gamma voltage depends on the specific status of the gamma curve of the vertical block Mura region deviating from the standard gamma curve until the adjusted gamma curve of the vertical block Mura region coincides with the standard gamma curve.

Herein, it should be noted that the present embodiment is described by taking the initial gamma value of the actually measured gamma curve within the vertical block Mura region being smaller than 2.2 as an example. However, if the initial gamma value of the actually measured gamma curve within the vertical block Mura region is greater than 2.2, the vertical block Mura phenomenon can also be improved by making corresponding changes to the steps described above.

The gamma curve of the liquid crystal display panel is as shown in FIG. 5, where 501 represents a standard gamma curve whose gamma value is 2.2. According to the requirements, the gamma curve of a normal display region coincides with a standard gamma curve whose gamma value is 2.2. However, in a region having the block Mura, due to display abnormality, the gamma curve within this region deviates from the standard gamma curve whose gamma value is 2.2. 502 represents a gamma curve whose gamma value is greater than 2.2, and 503 represents a gamma curve whose gamma value is smaller than 2.2. When the actually measured gamma curve is the gamma curve 503 whose gamma value is smaller than 2.2, the gamma curve 502 whose gamma value is greater than 2.2 is a gamma curve that is preset an input and used for making reference and calibration; in actual operation, the actually measured gamma curve can be the gamma curve 502 whose gamma value is greater than 2.2, then at this time, the gamma curve 503 whose gamma value is smaller than 2.2 is the gamma curve that is preset an input and used for making reference and calibrating.

In the case where the display device provided in the embodiment of the present disclosure adopts a plurality of source drivers, a plurality of gamma voltage registers can be disposed in respective source drivers individually, so as to further compensate for the gamma voltages of different regions on the display panel.

Figure 6:
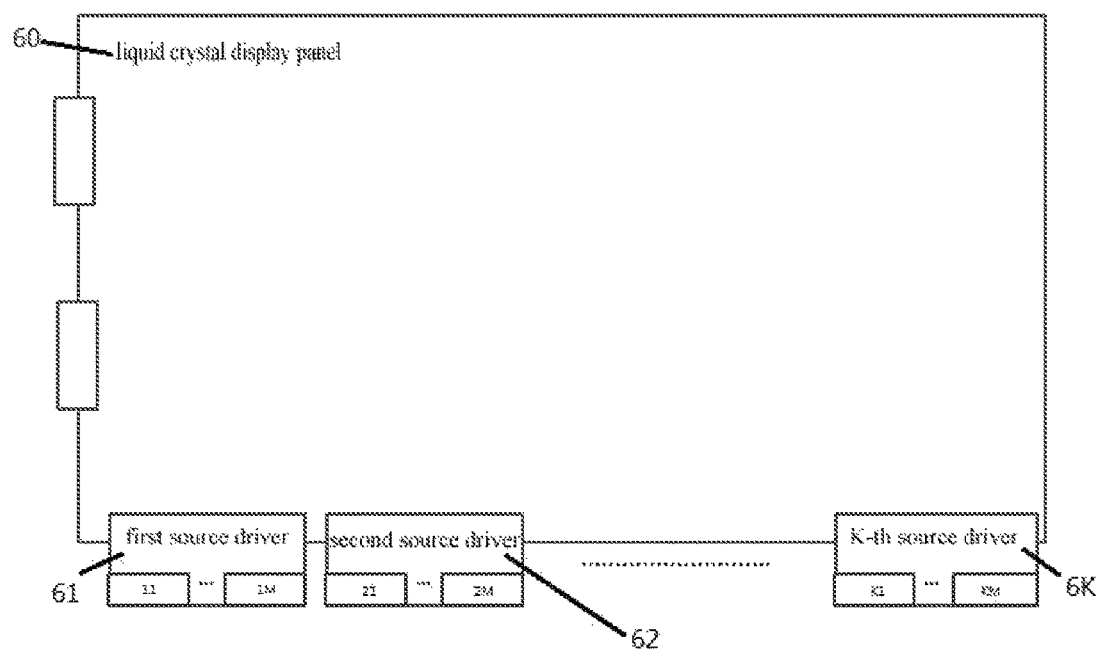
FIG. 6 is a schematic diagram of a structure that a first specific embodiment of a Mura compensation circuit provided in an embodiment of the present disclosure comprises M gamma registers disposed in each of source drivers when a display panel comprises a plurality of source drivers.

As shown in FIG. 6, by taking the display device comprising K source drivers (K is an integer greater than 12) disposed at lower side of the liquid crystal display panel 60 from left to right sequentially as an example, different gamma voltages can be set for different vertical block Mura regions corresponding to different source drivers, so as to compensate for display difference.

In FIG. 6, reference numeral 61 represents a first source driver, reference numeral 62 represents a second source driver, and 6K represents a K-th source driver. Each of the source drivers is provided with M gamma voltage registers (M is an integer greater than 1) from left to right. reference numeral 11 represents a first gamma register disposed in the first source driver 61, 1M represents a M-th gamma register disposed in the first source driver 61, 21 represents a first gamma register disposed in the second source register 62, and 2M represents a M-th gamma register disposed in the second source register 62; K1 represents a first gamma register disposed in the K-th source driver 6K, and KM represents the M-th gamma register disposed in the K-th source driver 6K.

Figure 7A:
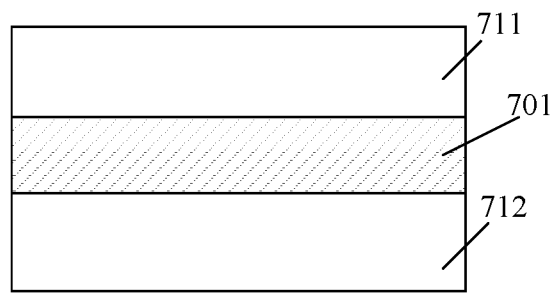
FIG. 7A is a schematic diagram of horizontal block Mura negative phenomenon occurring on a liquid display panel.

FIG. 7A shows a schematic diagram of a negative phenomenon of horizontal block Mura occurring on a liquid display panel. As shown in FIG. 7A, horizontal block Mura negative phenomenon occurs on the liquid display panel. In FIG. 7A, 701 represents a first horizontal block Mura region, 711 represents a first horizontal non-Mura region, and 712 represents a second horizontal non-Mura region.

In a second specific embodiment of the Mura compensation circuit provided in the embodiment of the present disclosure, different gate drive signals are input in the horizontal block Mura regions and the horizontal non-Mura region. These gate drive signals can have different high level values Vgh and/or low level values Vgl to achieve the effect of changing charging/discharging, such that different regions have the same display effect, so as to realize the purpose of improving negative phenomenon and raising quality of picture.

Figure 7B:
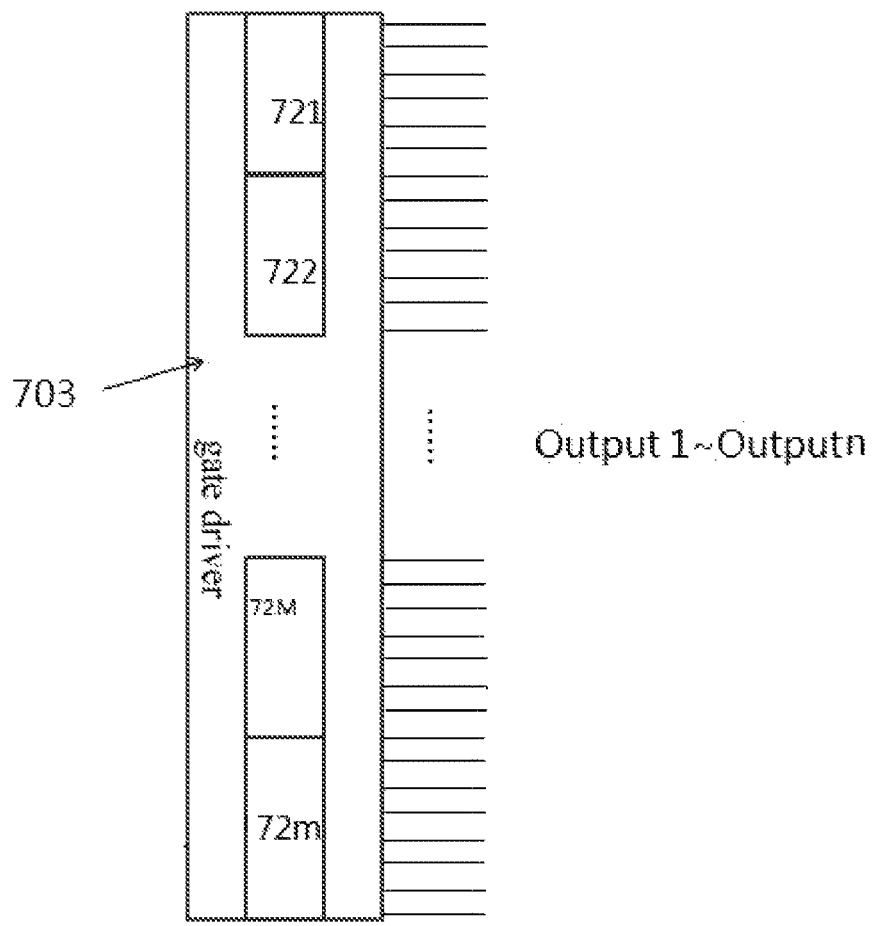
FIG. 7B is a schematic diagram of a structure that a second specific embodiment of a Mura compensation circuit provided in an embodiment of the present disclosure comprises a horizontal Mura compensation unit.

FIG. 7B shows a schematic diagram of a structure that a second specific embodiment of a Mura compensation circuit provided in an embodiment of the present disclosure comprises a horizontal Mura compensation unit. As shown in FIG. 7B, Output1-Outputn is n gate drive signal output terminals of the source driver, and reference numeral 703 represents a gate driver, where n is a positive integer.

The second specific embodiment of the Mura compensation circuit of the present disclosure comprises a horizontal Mura compensation unit. The horizontal Mura compensation unit comprises m shift registers disposed in the gate driver 703 comprised in the display device, where m is an integer greater than 3.

The m registers are disposed in the gate driver 703 from top to down sequentially.

In FIG. 7B, reference numeral 721 represents a first shift register, 722 represents a second shift register, 72M represents a M-th shift register, and 72m is a m-th shift register, where M is an integer, and M is equal to m−1; for example, when m is equal to 4, M is equal to 3.

As shown in FIG. 7B, for a gate driver including n gate drive signal output terminals, in the second specific embodiment of the Mura compensation circuit of the present disclosure, the gate drive signals are set as a plurality of groups (m groups) having different high level values and/or low level values. In terms of hardware, it only needs to transform and divide the shift register of the original single block into m shift registers. High level values Vgh and/or low level values Vgl of gate drive signals output by respective shift registers can be different.

Figure 8:
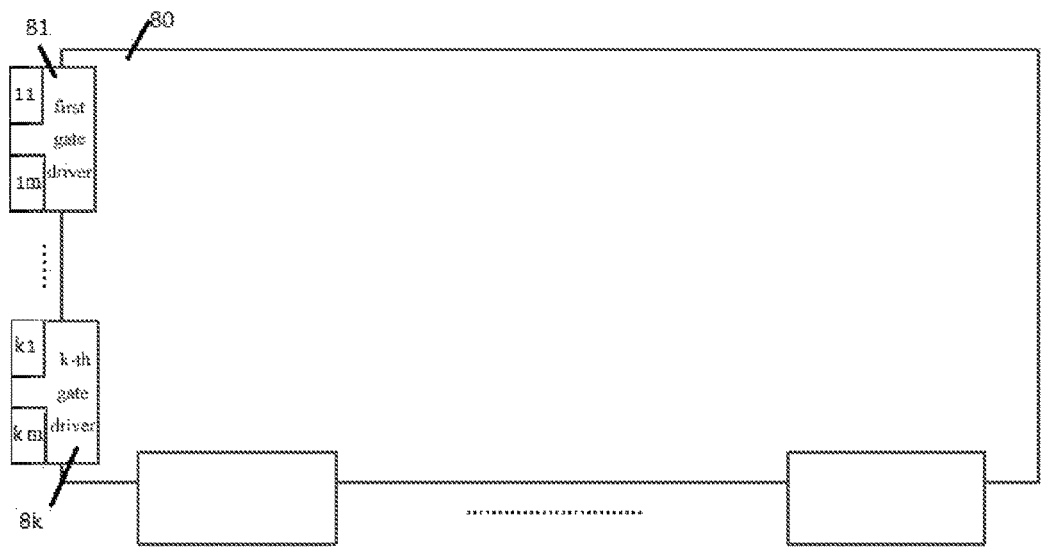
FIG. 8 is a schematic diagram of a structure that a second specific embodiment of a Mura compensation circuit provided in an embodiment of the present disclosure comprises m shift registers disposed in each of a plurality of gate drivers when a display panel comprises the plurality of gate drivers.

FIG. 8 shows a schematic diagram of a structure that a second specific embodiment of a Mura compensation circuit provided in an embodiment of the present disclosure comprises m shift registers disposed in each of a plurality of gate drivers when a display panel comprises the plurality of gate drivers. As shown in FIG. 8, k gate drivers disposed from top to down sequentially are disposed at left side of the liquid crystal display panel 80, where k is a positive integer. In FIG. 8, 11 represents a first shift register disposed in a first gate driver 81, 1m represents a m-th shift register disposed in the first gate driver 81, and m shift registers set in the first gate driver 81 are disposed in the first gate driver 81 from top to down sequentially; k1 represents a first shift register unit disposed in a k-th gate driver 8k, km represents a m-th shift register unit disposed in the k-th gate driver 8k, and $m$ shift registers disposed in the k-th gate driver 8k are disposed in the k-th gate driver 8k sequentially.

Figure 9:
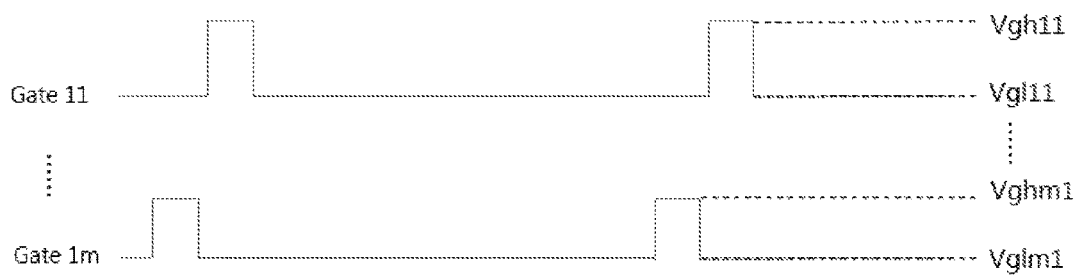
FIG. 9 is a waveform diagram of a gate driving signal output by a shift register.

FIG. 9 shows a waveform diagram of gate driving signals output by a shift register. As shown in FIG. 9, Gate11 represents a gate drive signal output by a shift register 11, and Gatem is a gate drive signal output by a shift register 1m. High level value of Gate11 is Vgh11, low level value of Gate11 is Vgl11, high level value of Gate1m is Vgh1m, and low level value of Gate1m is Vgl1m. it can be known from FIG. 9 that Vgh11 is not equal to Vghm1, and Vghl11 can also be unequal to Vglm1.

Herein, it should be noted that the plurality of shift registers disposed in the gate driver not only can achieve the effect of compensating for charging/discharging by changing the high level value Vgh and/or the low level value Vgl of the output gate drive signal, but also can achieve the effect of compensation by changing duty ratios of charging/discharging control signals such as a TP signal, an OE signal or the like that influence the charging/discharging effect of the liquid crystal display panel.

Figure 10:
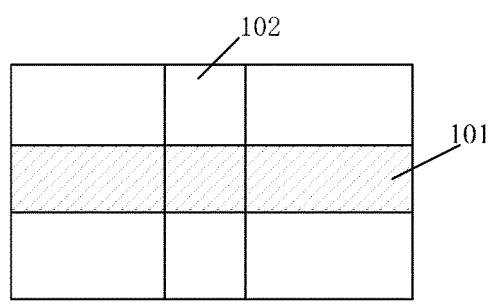
FIG. 10 is a schematic diagram of vertical block Mura negative phenomenon and horizontal block Mura negative phenomenon occurring on a liquid crystal display panel simultaneously.

FIG. 10 shows a schematic diagram of vertical block Mura negative phenomenon and horizontal block Mura negative phenomenon occurring simultaneously on a liquid crystal display panel. In actual operation, there also exists the situation of the vertical block Mura regions and horizontal block Mura region occurring on the liquid crystal display panel simultaneously. For example, as shown in FIG. 10, reference numeral 101 on the display panel represents the vertical block Mura region, and reference numeral 102 on the display panel represents the horizontal block Mura region. At this time, a third specific embodiment of the Mura compensation circuit provided in the present disclosure adopts the vertical Mura compensation unit and the horizontal Mura compensation unit simultaneously. The structure of the vertical Mura compensation unit can be the same as the structure of the first specific embodiment of the Mura compensation circuit provided in the present disclosure, and the structure of the horizontal Mura compensation unit can be the same as the structure of the second specific embodiment of the Mura compensation circuit provided in the present disclosure. It should be noted that in FIG. 10, there is a region where the horizontal Mura phenomenon and the vertical Mura phenomenon occur simultaneously, i.e., a region where the vertical block Mura region 101 overlaps with the horizontal block Mura region 102. With respect to the Mura phenomenon compensation for this region, not only different gamma voltages are provided simultaneously through the gamma voltage register disposed in the source driver to compensate for the vertical Mura phenomenon, but also it is needed that gate drive signals whose high level values and/or low level values are different are provided through the shift register disposed in the gate driver (or the duty ratio of the charging/discharging control signal are changed) to compensate for the horizontal Mura phenomenon.

The display device provided in the embodiment of the present disclosure comprises a display panel and a driving circuit of the display panel.

The above descriptions are alternative implementations of the present disclosure. It shall be pointed out that for those skilled in the art, several improvements and modifications can further be made without departing from the principles of the present disclosure. These improvements and modifications shall also be deemed as pertaining to the protection scope of the present disclosure.

The present application claims the priority of a Chinese patent application No. 201610108632.9 filed on Feb. 26, 2016. Herein, the content disclosed by the Chinese patent application is incorporated in full by reference as a part of the present disclosure.

What is claimed is:

1. A Mura compensation circuit, comprising:
   a vertical Mura compensation unit, configured to compensate for a vertical Mura phenomenon by providing a corresponding gamma voltage to a vertical block Mura region and a vertical non-Mura region of a display panel respectively; and
   a horizontal Mura compensation unit, configured to compensate for a horizontal Mura phenomenon by providing a corresponding gate drive signal and/or a corresponding charging/discharging control signal to a horizontal block Mura region and a horizontal non-Mura region of a display panel respectively.

2. The Mura compensation circuit according to claim 1, wherein the horizontal Mura compensation unit is used to provide a first gate drive signal to the horizontal block Mura region and provide a second gate drive signal to the horizontal non-Mura region;
   a high level value of the first gate drive signal and a high level value of the second gate drive signal are different; and/or
   a low level value of the first gate drive signal and a low level value of the second gate drive signal are different.

3. The Mura compensation circuit according to claim 1, wherein the horizontal Mura compensation unit is configured to provide a charging/discharging control signal having different duty ratios to the horizontal block Mura region and the horizontal non-Mura region; and
   the charging/discharging control signals include a data source row latch signal and/or an output enable signal.

4. The Mura compensation circuit according to claim 1, wherein the vertical Mura compensation unit comprises a plurality of gamma voltage registers, which are disposed in a source driver.

5. The Mura compensation circuit according to claim 1, wherein the horizontal Mura compensation unit comprises a plurality of shift register units, each of which outputs a corresponding gate drive signal.

6. A driving circuit of a display panel, comprising the Mura compensation circuit according to claim 1.

7. The driving circuit of the display panel according to claim 6, further comprising N source drivers disposed along a horizontal direction at an upper side or a lower side of the display panel, where N is a positive integer;

the vertical Mura compensation unit in the Mura compensation circuit comprises M gamma voltage registers, where M is an integer greater than 1; and each of the N source drivers is disposed with a plurality of gamma voltage registers disposed along the horizontal direction.

8. The driving circuit of the display panel according to claim 6, further comprising a gate driver;

a horizontal Mura compensation unit in the Mura compensation circuit comprises a plurality of shift register units disposed sequentially from top to down along a left side or a right side of the display panel, each of which outputs a corresponding gate drive signal; and the plurality of shift register units are disposed in the gate driver.

9. A display device, comprising a display panel and the driving circuit of the display panel according to claim 6.

10. The display device according to claim 9, wherein the horizontal Mura compensation unit is used to provide a first gate drive signal to the horizontal block Mura region and provide a second gate drive signal to the horizontal non-Mura region;

a high level value of the first gate drive signal and a high level value of the second gate drive signal are different; and/or a low level value of the first gate drive signal and a low level value of the second gate drive signal are different.

11. The display device according to claim 9, wherein the horizontal Mura compensation unit is configured to provide a charging/discharging control signal having different duty ratios to the horizontal block Mura region and the horizontal non-Mura region the charging/discharging control signals include a data source row latch signal and/or an output enable signal.

12. The display device according to claim 9, wherein the vertical Mura compensation unit comprises a plurality of gamma voltage registers, which are disposed in a source driver.

13. The driving circuit according to claim 6, wherein the horizontal Mura compensation unit is used to provide a first gate drive signal to the horizontal block Mura region and provide a second gate drive signal to the horizontal non-Mura region;

a high level value of the first gate drive signal and a high level value of the second gate drive signal are different; and/or a low level value of the first gate drive signal and a low level value of the second gate drive signal are different.

14. The driving circuit according to claim 6, wherein the horizontal Mura compensation unit is configured to provide a charging/discharging control signal having different duty ratios to the horizontal block Mura region and the horizontal non-Mura region, wherein the charging/discharging control signals include a data source row latch signal and/or an output enable signal.

15. The driving circuit according to claim 6, wherein the vertical Mura compensation unit comprises a plurality of gamma voltage registers, which are disposed in a source driver.

16. The driving circuit according to claim 6, wherein the horizontal Mura compensation unit comprises a plurality of shift register units, each of which outputs a corresponding gate drive signal.

17. A Mura compensation method, comprising:

compensating for a vertical Mura phenomenon by providing, by a vertical Mura compensation unit, a corresponding gamma voltage to a vertical block Mura region and a vertical non-Mura region of a display panel respectively; and compensating for a horizontal Mura phenomenon by providing, by a horizontal Mura compensation unit, a corresponding gate drive signal and/or a corresponding charging/discharging control signal to a horizontal block Mura region and a horizontal non-Mura region of a display panel respectively.

18. The Mura compensation method according to claim 17, wherein the providing, by the horizontal Mura compensation unit, the corresponding gate drive signal and/or the corresponding charging/discharging control signal to the horizontal block Mura region and the horizontal non-Mura region of the display panel respectively comprises: providing, by the horizontal Mura compensation unit, a first gate drive signal to the horizontal block Mura region and a second gate drive signal to the horizontal non-Mura region;

a high level value of the first gate drive signal and a high level value of the second gate drive signal are different; and/or a low level value of the first gate drive signal and a low level value of the second gate drive signal are different.

19. The Mura compensation method according to claim 17, wherein the providing, by the horizontal Mura compensation unit, the corresponding charging/discharging control signal to the horizontal block Mura region and the horizontal non-Mura region of the display panel respectively comprises: providing, by the horizontal Mura compensation unit, charging/discharging control signals having different duty ratios to the horizontal block Mura region and the horizontal non-Mura region, wherein the charging/discharging control signals include a data source row latch signal and/or an output enable signal.

20. The Mura compensation method according to claim 17, further comprising: sampling gamma voltage of a Mura region on the display panel to obtain a corresponding sample gamma curve, comparing the sample gamma curve with a standard gamma curve, and adjusting it into a gamma voltage provided by the Mura region according to a comparison result until an adjusted gamma curve of the Mura region coincides with the standard gamma curve.

* * * * *